United States Patent
Kokusho (10) Patent No.: US 7,355,759 B1
(45) Date of Patent: Apr. 8, 2008

(54) PRINT ORDER/DELIVERY SYSTEM AND METHOD, DIGITAL CAMERA, CLIENT INFORMATION REGISTRATION DEVICE, ORDERING TERMINAL, AND PRINTING SYSTEM

(75) Inventor: Koichi Kokusho, Tokyo (JP)

(73) Assignee: Sony Corporation, Tokyo (JP)

( * ) Notice: Subject to any disclaimer, the term of this patent is extended or adjusted under 35 U.S.C. 154(b) by 859 days.

(21) Appl. No.: 09/628,775

(22) Filed: Jul. 29, 2000

(30) Foreign Application Priority Data

Jul. 30, 1999 (JP) ............................... P11-217771

(51) Int. Cl.
H04N 1/00 (2006.01)
H04N 1/32 (2006.01)
G06F 3/12 (2006.01)
G06F 15/16 (2006.01)
G06K 1/00 (2006.01)

(52) U.S. Cl. ...................... 358/440; 358/1.15; 358/434; 358/438

(58) Field of Classification Search ................... None
See application file for complete search history.

(56) References Cited

U.S. PATENT DOCUMENTS

| | | | | |
|---|---|---|---|---|
| 5,606,365 A | * | 2/1997 | Maurinus et al. | 348/222.1 |
| 5,666,215 A | * | 9/1997 | Fredlund et al. | 358/457 |
| 5,974,401 A | * | 10/1999 | Enomoto et al. | 705/40 |
| 6,157,459 A | * | 12/2000 | Shiota et al. | 358/1.15 |
| 6,396,537 B1 | * | 5/2002 | Squilla et al. | 348/239 |
| 6,573,927 B2 | * | 6/2003 | Parulski et al. | 348/32 |
| 6,642,956 B1 | * | 11/2003 | Safai | 348/222.1 |
| 6,707,570 B1 | * | 3/2004 | Gotanda et al. | 358/1.15 |
| 6,750,902 B1 | * | 6/2004 | Steinberg et al. | 348/211.3 |
| 6,771,896 B2 | | 8/2004 | Tamura et al. | |
| 6,919,920 B2 | | 7/2005 | Squilla et al. | |
| 6,995,857 B2 | * | 2/2006 | Lee | 358/1.15 |
| 2002/0063889 A1 | * | 5/2002 | Takemoto et al. | 358/1.15 |
| 2003/0053124 A1 | * | 3/2003 | Iijima et al. | 358/1.15 |
| 2003/0065619 A1 | * | 4/2003 | Shitano | 705/50 |
| 2003/0065807 A1 | * | 4/2003 | Satomi et al. | 709/231 |
| 2003/0095283 A1 | * | 5/2003 | Nakajima | 358/1.15 |
| 2005/0114232 A1 | * | 5/2005 | McIntyre et al. | 705/27 |

FOREIGN PATENT DOCUMENTS

| | | |
|---|---|---|
| EP | 10078618 | 3/1998 |
| EP | 0844781 A2 | 5/1998 |
| EP | 0869660 A2 | 10/1998 |
| EP | 0930774 A2 | 7/1999 |
| JP | 10-078619 | 3/1998 |
| JP | 10078618 A * | 3/1998 |

OTHER PUBLICATIONS

European Search Report.

* cited by examiner

*Primary Examiner*—Twyler Lamb
*Assistant Examiner*—Myles D Robinson
(74) *Attorney, Agent, or Firm*—Reed Smith LLP (57) ABSTRACT

A print order/delivery system and method, and a printing system, wherein a previously assigned unique identification data is stored on a user side of the system, and the user is registered such that the user is associated with the identification data. Pictorial data is transmitted to a print-order receiving side along with the identification data and order data, and then, on the print-order receiving side, a picture based on the supplied pictorial data is printed on the basis of the order data. The user is recognized from a group of registered users on the basis of the supplied identification data.

11 Claims, 8 Drawing Sheets

PRINT ORDER/DELIVERY SYSTEM AND METHOD, DIGITAL CAMERA, CLIENT INFORMATION REGISTRATION DEVICE, ORDERING TERMINAL, AND PRINTING SYSTEM

BACKGROUND OF THE INVENTION

1. Field of the Invention

This invention relates to a print order/delivery system and method, a digital camera, a client information registration device, an ordering terminal, and a printing system, and more particularly, is suitably applied to, for instance, an order/delivery system of a digital print.

2. Description of the Related Art

According to the conventional method, when giving an order for a print of a silver film photograph, one takes a film with which a shooting has been performed along to a window of a print shop and such, so as to make a request of developing and printing, and then goes to there in order to accept the printed photograph after the specified date.

Recently, a digital camera, which takes in a picture electronically, has appeared, and so such aspect of print service is being performed that a recording medium such as a memory card and a floppy disk on which pictorial data has been recorded or a digital camera itself is carried in the window of a print shop and such.

By the way, according to such conventional method, there is a troublesome problem that the orderer is required to go to the window of a print shop and the like no less than two times so as to give the order for prints and to receive them.

Besides, in recent years, a colour printer for use at home has come into widespread use; however, when a large quantity of printing is to be performed, it requires considerable time and effort, and, in a few cases, the cost of a printer and a print material becomes a large burden.

SUMMARY OF THE INVENTION

In view of the foregoing, an object of the invention is to provide a print order/delivery system and method, a digital camera, a client information registration device, an ordering terminal, and a printing system capable of rendering a print order easier.

The foregoing objects and other objects of the invention have been achieved by the provision of a print order/delivery system which comprises: a storage means for storing identification data; a registration means for registering the user in such a way as to associate him with the identification data; an ordering means for transmitting pictorial data to the print order receiving side along with the identification data and order data; and a user management means for recognizing the orderer out of the registered users, on the basis of the identification data which is transmitted from the ordering means.

As the result of this, in this print order/delivery system, the orderer of a print is able to give an order via the ordering means without going to the window of a print shop and such, therefore, the burden on the orderer can be reduced. Besides, in this print order/delivery system, at the time of giving the order for a print, the previously assigned identification data is transmitted to the print order receiving side along with the pictorial data and the order data, therefore, the orderer is able to give the order for a print through a simple procedure, and so the burden on the orderer of a print can be further reduced.

Besides, the present invention provides a print order/delivery method which comprises the steps of: storing previously assigned unique identification data which is performed on the user side, and registering the user in such a way as to associate him with the identification data; transmitting pictorial data to the print order receiving side along with the identification data and order data; and recognizing the orderer out of the registered users on the basis of the supplied identification data, and delivering the resulted print of the picture to the very orderer, which are performed on the print order receiving side.

As the result of this, according to this print order/delivery method, the orderer of a print is able to give an order via the ordering means without going to the window of a print shop and such, therefore, the burden on the orderer can be reduced. Besides, according to this print order/delivery method, at the time of giving the order for a print, the previously assigned identification data is transmitted to the print order receiving side along with the pictorial data and the order data, therefore, the orderer is able to give the order for a print through a simple procedure, and so the burden on the orderer of a print can be further reduced.

Further, the present invention provides a digital camera comprising a storage means for storing unique identification data previously assigned to the digital camera.

As a result, according to this digital camera, recognition can be performed on the basis of the identification data stored in the storage means.

Still further, the present invention provides a client information registration device comprising an identification data assigning means for previously assigning unique identification data to a digital camera.

As a result, according to this client information registration device, the digital camera can be recognized on the basis of the identification data assigned by the identification data assigning means.

Furthermore, the present invention provides an ordering terminal device comprising a data inputting means for inputting pictorial data of the picture and the identification data from a digital camera which is previously assigned unique identification data.

As a result, according to this ordering terminal device, it is possible to determine from which digital camera the pictorial data is inputted on the basis of the inputted identification data.

Furthermore, the present invention provides a printing system for printing a picture taken by a digital camera having identification data previously assigned comprising: a receiving means for receiving identification data and user information transmitted from a registration means side which registers a user associated with the identification data or receiving pictorial data of the picture, the identification data and order data transmitted from a print ordering side; a printing means for printing a picture based on the pictorial data on the basis of the received order data; and a user management means for recognizing the orderer out of the registered users on the basis of the received identification data.

As a result, according to this printing system, an orderer of a print can be recognized easily and accurately.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Configuration of Print Order/Delivery System of the Embodiment

Figure 1:
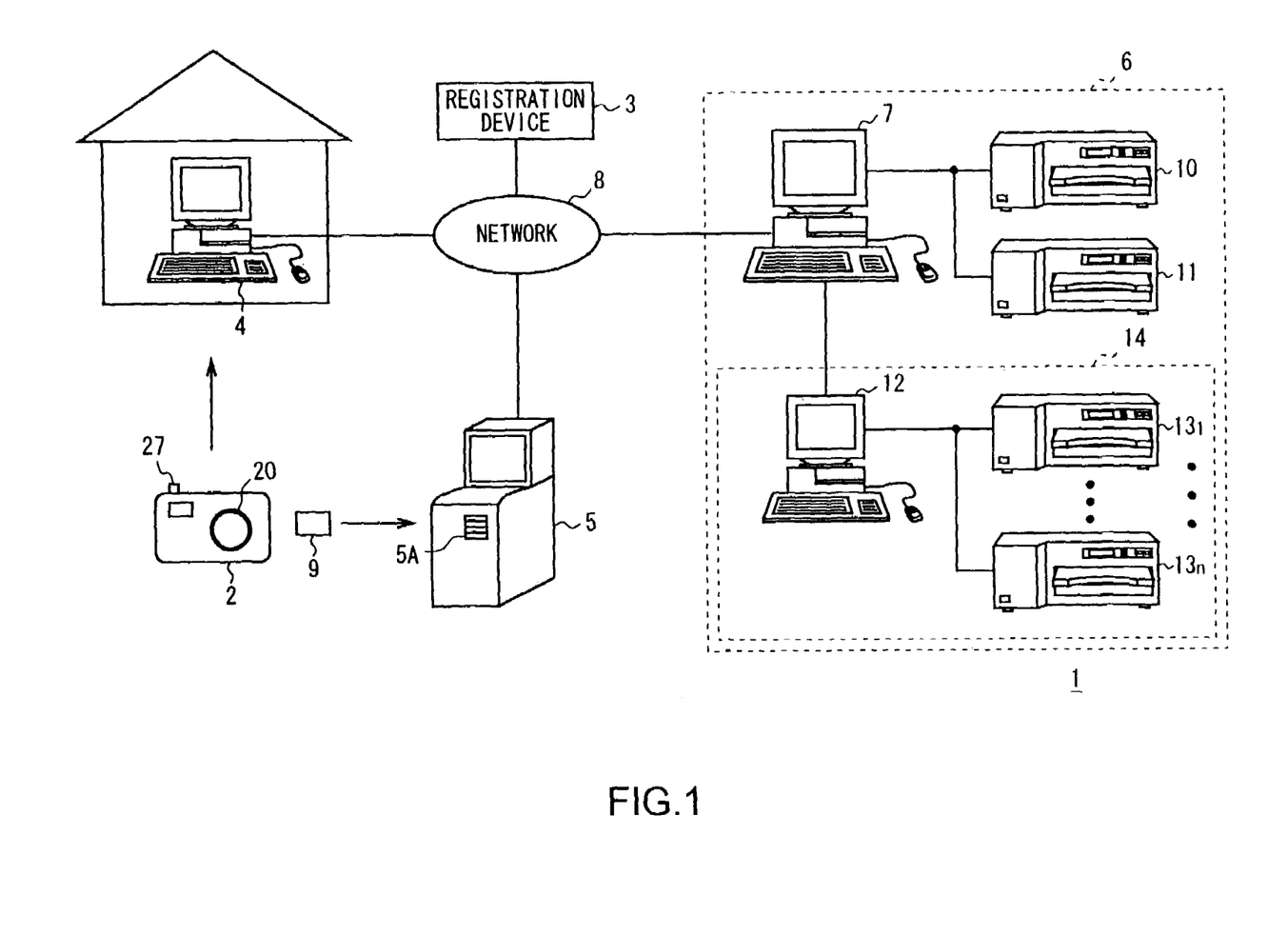
FIG. 1 is a block diagram illustrating a configuration of a print order/delivery system according to the embodiment.

Referring to FIG. 1, a print order/delivery system of the embodiment generally designated as 1 is comprised of a registration device 3 for assigning a unique identification code to a digital still camera 2, a client computer 4 and a dedicated terminal device 5 which are utilized for giving an order for a print of a picture taken in electronically by the digital still camera 2, and a user managing and order receiving computer 7 of a print order receiving side system division 6 placed on the print order receiving side, which are connected to each other via a network 8 such as a telephone line network or the Internet.

In this case, the digital still camera 2 is adapted to communicating with the registration device 3, the client computer 4, and the dedicated terminal device 5, by the use of the stated communication mode, such as the Institute Electrical and Electronics Engineer (IEEE), the Universal Serial Bus (USB), infrared communication, and wireless communication, and adapted to transferring the pictorial data which has been obtained by picture-taking to the client computer 4 or the dedicated terminal device 5 in accordance with a data transfer request sent from the client computer 4 or the dedicated terminal device 5.

Besides, the registration device 3 is placed on a distributor and such of a digital still camera 2, and adapted to assigning a unique identification code to a digital still camera 2. In addition, the registration device 3 is adapted to inputting the required various information (hereinafter, this is referred to as user information) such as the name, the address, and the telephone number of the user of the digital still camera 2, and the account number of a bank or a post office, and sends the inputted user information data to the user managing and order receiving computer 7 of the print order receiving side system division 6 via the network 8.

The client computer 4 is an ordinary personal computer which belongs to, for instance, the user of the digital still camera 2, and the stated program for giving an order to a print dealer (hereinafter, this is referred to as a print order program) has been previously installed therein.

This print order program has been obtained and downloaded through a communication with the user managing and order receiving computer 7 of the print order receiving side system division 6. And, on the basis of this print order program, the client computer 4 is able to communicate with the digital still camera 2 and to take in the pictorial data from the digital still camera 2 along with the data of the above-mentioned identification code (hereinafter, this is referred to as identification data), and also able to read the pictorial data and the identification data from the memory card 9 which has been taken out of the digital still camera 2 and then charged in a card slot (not shown).

Besides, on the basis of the print order program, the client computer 4 displays the stated order panel in response to the user manipulation. As a result of this, utilizing this order panel, the user is able to select such a picture that he or she intends to give an order for a print of it, out of the pictures based on the pictorial data taken in from the digital still camera 2 or a memory card 9, and also able to select the number of the print sheets, the print size, the type of the printing paper and the like with respect to the very picture.

And, the data of the order contents which has been inputted in this manner (hereinafter, this is referred to as the order data) is sent to the user managing and order receiving computer 7 of the print order receiving side system division 6, via the network 8, along with the corresponding pictorial data and the identification data.

On the other hand, the dedicated terminal device 5, which is placed on a convenience store and such, is adapted to communicating with the digital still camera 2 and to taking in the pictorial data which has been obtained by picture-taking from the digital still camera 2 along with the identification data, and also adapted to reading the pictorial data and the identification data from the memory card 9 which has been taken out of the digital still camera 2 and then charged in a card slot (not shown).

And, the dedicated terminal device 5 displays the order panel based on the above-mentioned print order program which has been previously installed, in response to the manipulation of the user; and then it sends the order data, which is comprised of the data of the order contents inputted utilizing the order panel, to the user managing and order receiving computer 7 of the print order receiving side system division 6, along with the pictorial data and the identification data which have been obtained by communication with the digital still camera 2 or by reading out of the memory card 9, via the network 8.

The print order receiving side system division 6 is comprised of the user managing and order receiving computer 7, a mail destination printer 10, a receipt printer 11, and a printing division 14; the printing division 14 is, in turn, comprised of a printing control computer 12 and a plural number of picture printers $13_1$ to $13_n$.

In this case, the user managing and order receiving computer 7 sequentially registers user information data, which are given from the registration device 3 via the network 8, on a database for user-managing purpose (hereinafter, this is referred to as a user-managing database), in such a way as to associate them with their corresponding identification codes.

Besides, if order data has been given from the client computer 4 or the dedicated terminal device 5 after this, the user managing and order receiving computer 7 sends the pictorial data which is transferred together with the very order data to the printing control computer 12 of the printing division 14.

And, the printing control computer 12 exposes the supplied pictorial data to the stated signal processing as necessary, sends the resulted pictorial data to one of the picture printers 13₁ to 13ₙ which is unused at that time, and causes it to print a picture based on the very pictorial data hereby.

Besides, the user managing and order receiving computer 7 recognizes the user who has given the order for the print, on the basis of the identification code which is given together with the order data and the user-managing database, and then causes the mail destination printer 10 to print the mail destination such as the name and the address of the very user on an envelope.

Besides, the user managing and order receiving computer 7 calculates the charge of the print on the basis of the order data, and then, on the basis of the result of the calculation, requests the banking organ to pull down the charge from the account of the user who has given the order for the print; on the other hand, it causes the receipt printer 11 to print the receipt based on the result of the calculation of the print charge.

So, the print dealer enters the photograph which has been printed by the picture printers 13₁ to 13ₙ in an envelope on which the mail destination has been printed by the mail destination printer 10, along with the receipt which has been printed by the receipt printer 11, and then delivers the printed photograph through the post.

Thus, in this print order/delivery system 1, the user who intends to give an order for a print is able to give the order for a print of the picture which has been taken utilizing the digital still camera 2 and receive it, without going to the stated window.

(2) Detail Configuration of Each Device (2-1) Configuration of Digital Still Camera 2

Figure 2:
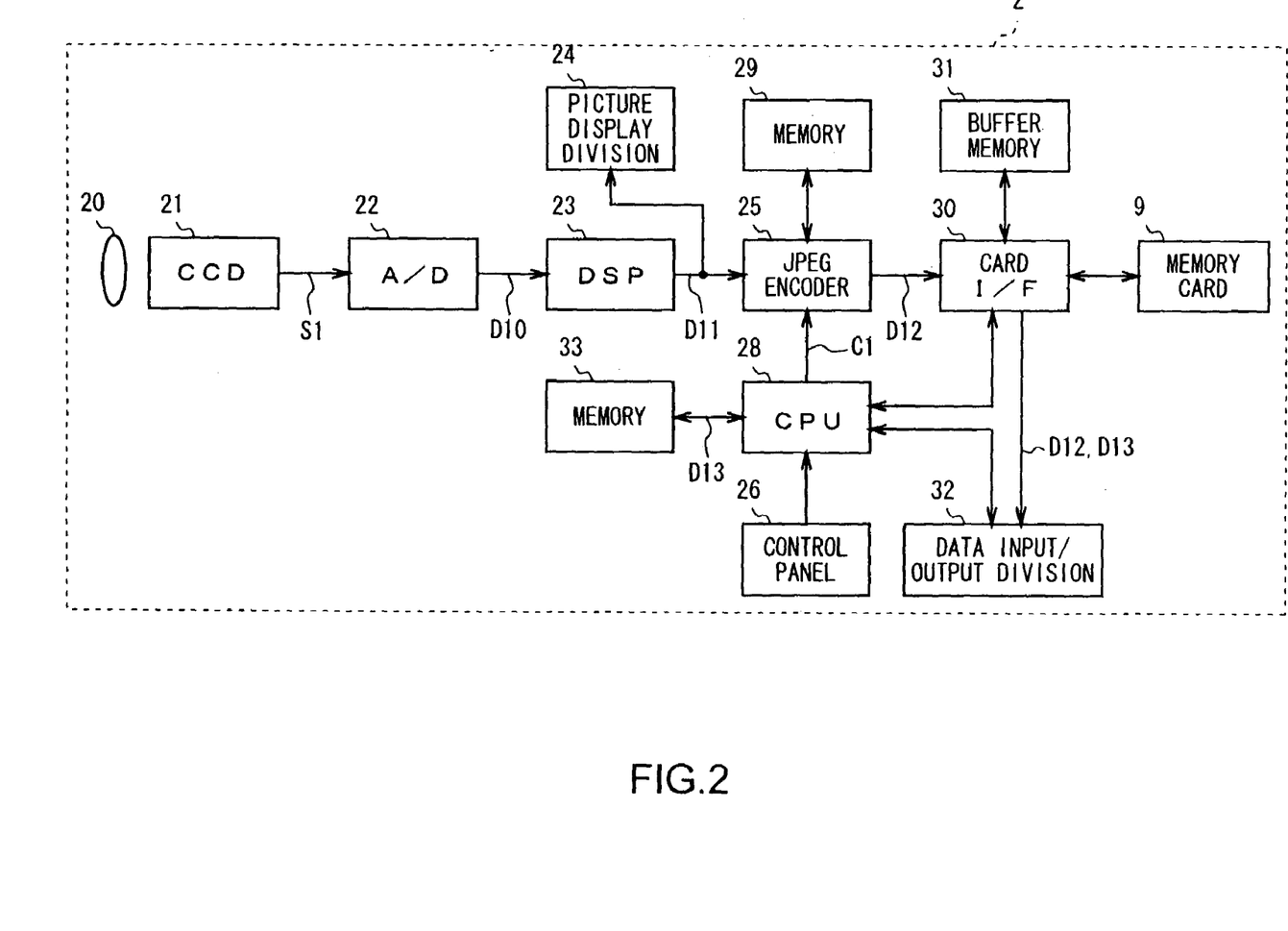
FIG. 2 is a block diagram showing a configuration of a digital still camera according to the embodiment.

At here, the digital still camera 2 has a configuration shown in FIG. 2, gathers the optical image of an object on the light-receiving surface of a Charge Coupled Device (CCD) 21 via a lens 20, effects photoelectric conversion of the optical image with the CCD 21, and sends the resulted image signal S1 to an analog-to-digital conversion circuit 22.

The analog-to-digital conversion circuit 22 effects digital conversion of the image signal S1, and sends the resulted image data D10 to a digital signal processor 23. The digital signal processor 23 applies the stated signal processing to the image data D10, and sends the resulted pictorial data D11 to a picture display division 24 which is comprised of a liquid crystal displaying panel and such, so as to cause it to display the picture based on the very pictorial data D11.

Besides, the digital signal processor 23 sends the pictorial data D11 to also a Joint Photographic Coding Experts Group (JPEG) encoder 25. At this time, to the JPEG encoder 25, an encode instruction C1 is given from a Central Processing Unit (CPU) 28 at the instant when the user has performed pressing manipulation of a shutter button 27 (FIG. 1) of a control panel 26.

Then, the JPEG encoder 25 stores the pictorial data D11 of the quantity which corresponds to one picture in a memory 29 at the instant when the encode instruction C1 has been given, and also effects compression coding of this data on the basis of the JPEG standard, and then sends the resulted encoded pictorial data D12 to a card interface circuit 30.

The card interface circuit 30 sequentially stores the supplied encoded pictorial data D12 in a buffer memory 31, and reads out the data at the stated timing, so as to store the data in the corresponding storage area of a memory in the memory card 9, sequentially.

In this way, this digital still camera 2 encodes the pictorial data D11 of the instant when the press-down manipulation of the shutter button 27 has been performed, and records it in the memory card 9.

Besides, the digital still camera 2 is provided with a data input/output division 32 for performing communication with a registration device 3, a client computer 4 and a dedicated terminal device 5 as stated above; the CPU 28 and the card interface circuit 30 are connected to the very data input/output division 32.

In this case, the CPU 28 stores the above-mentioned identification data D13 which has been obtained through the communication with the registration device 3 in a non-volatile memory 33 such as an Electrically Erasable and Programmable Read Only Memory (EEPROM) and the like which has been previously placed in the inside of the digital still camera 2.

After this time, when a memory card 9 has been charged in the inside of the enclosure, the CPU 28 reads the identification data D13 from the non-volatile memory 33 and sends it to the card interface circuit 30, so as to cause the stated storage area of the memory included in the memory card 9 to record this identification data D13.

In addition, after this time, when the picture-taking mode has been selected and the press-down manipulation of the shutter button 27 has been performed in that status, the CPU 28 controls the required circuit in a manner so as to cause it to record the pictorial data (encoded pictorial data D12) of the instant when the press-down manipulation of the shutter button 27 has been performed on the memory included in the memory card 9.

And, after this time, when a transfer instruction of the pictorial data has been given through communication with an external device such as the client computer 4 and the dedicated terminal device 5, the CPU 28 controls the card interface circuit 30 in a manner so as to cause it to read the pictorial data which has been obtained by picture-taking (encoded pictorial data D12) from the memory card 9 along with the identification data D13, and to send this to the partner of the communication (the client computer 4 or the dedicated terminal device 5) via the data input/output division 32.

Thus, the digital still camera 2 is adapted to sending the pictorial data which has been obtained by picture-taking (encoded pictorial data D12) to the partner of the communication along with the identification data D13, in response to the request sent from the client computer 4 or the dedicated terminal device 5.

(2-2) Configuration of Registration Device 3

Figure 3:
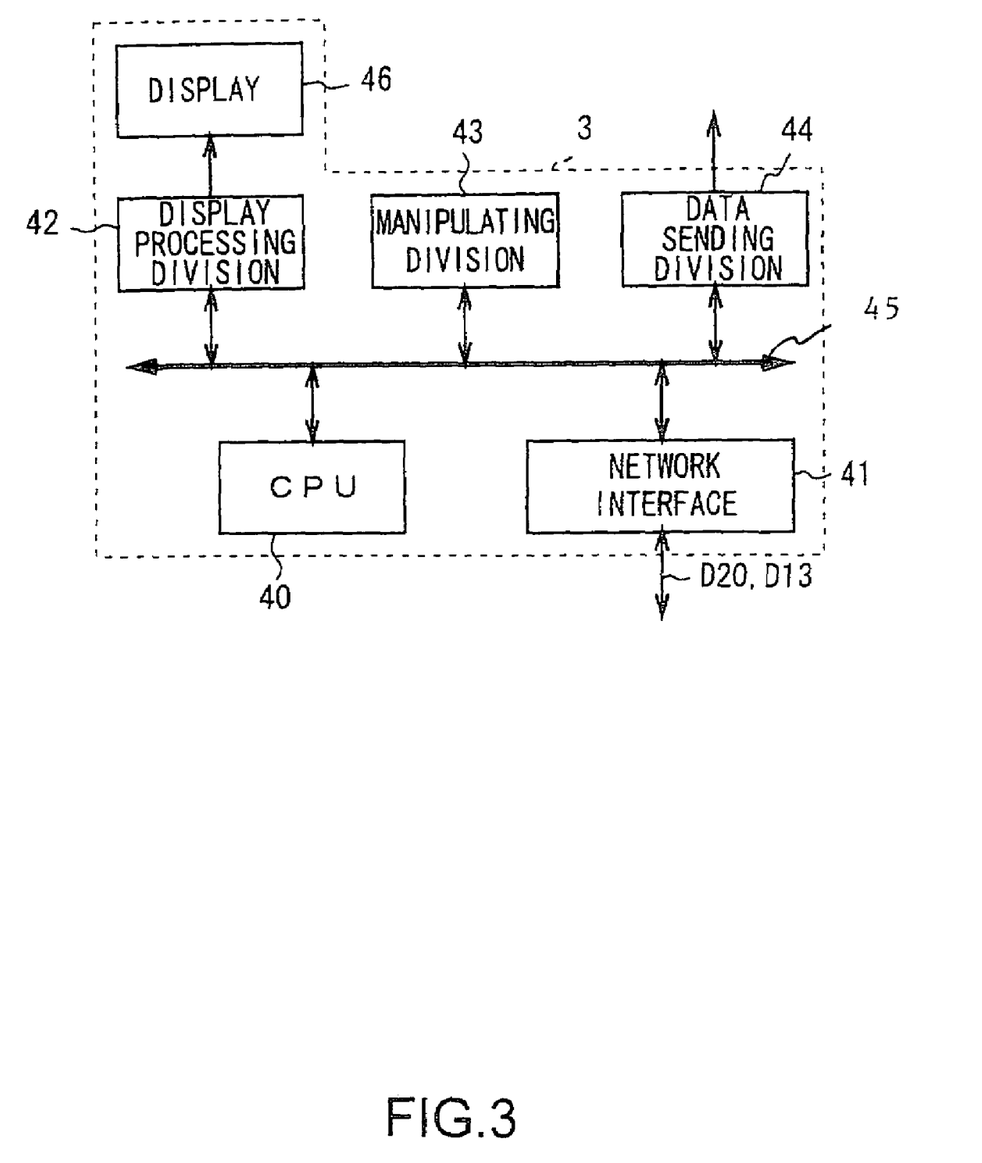
FIG. 3 is a block diagram showing a configuration of a registration device.

On the other hand, as shown in FIG. 3, the configuration of the registration device 3 is such that a CPU 40, a network interface circuit 41, a display processing division 42, a manipulating division 43, and a data sending division 44 are connected to each other via a bus 45, and a display unit 46 is connected to the display processing division 42.

In this case, when the inputting mode of the user information has been selected after the digital still camera 2 has been set to the stated status, the CPU 40 controls the display processing division 42 in a manner so as to cause it to display the stated registration screen which is used for inputting the user information such as the name, the address, the telephone number and the account number of the user on the display unit 46.

And, when the manipulating division 43 has been manipulated in this status and the required user information such as the user's name has been inputted hereby and, after this, the registration request has been given, the CPU 40 transfers the user information D20 to the user management and order receiving computer 7 of the print order receiving side system division 6 along with the user registration request via the network interface division 41.

Besides, the CPU 40 gives the identification data D13 which is given from the user management and order receiving computer 7 of the print order receiving side system division 6 as the result of this to the digital still camera 2 via the data outputting division 44, and causes it to store this.

Thus, the registration device 3 is adapted to assigning an identification code to a digital still camera 2, and to registering a user in such a way as to associate him with the very identification code.

(2-3) Configuration of Client Computer 4

Figure 4:
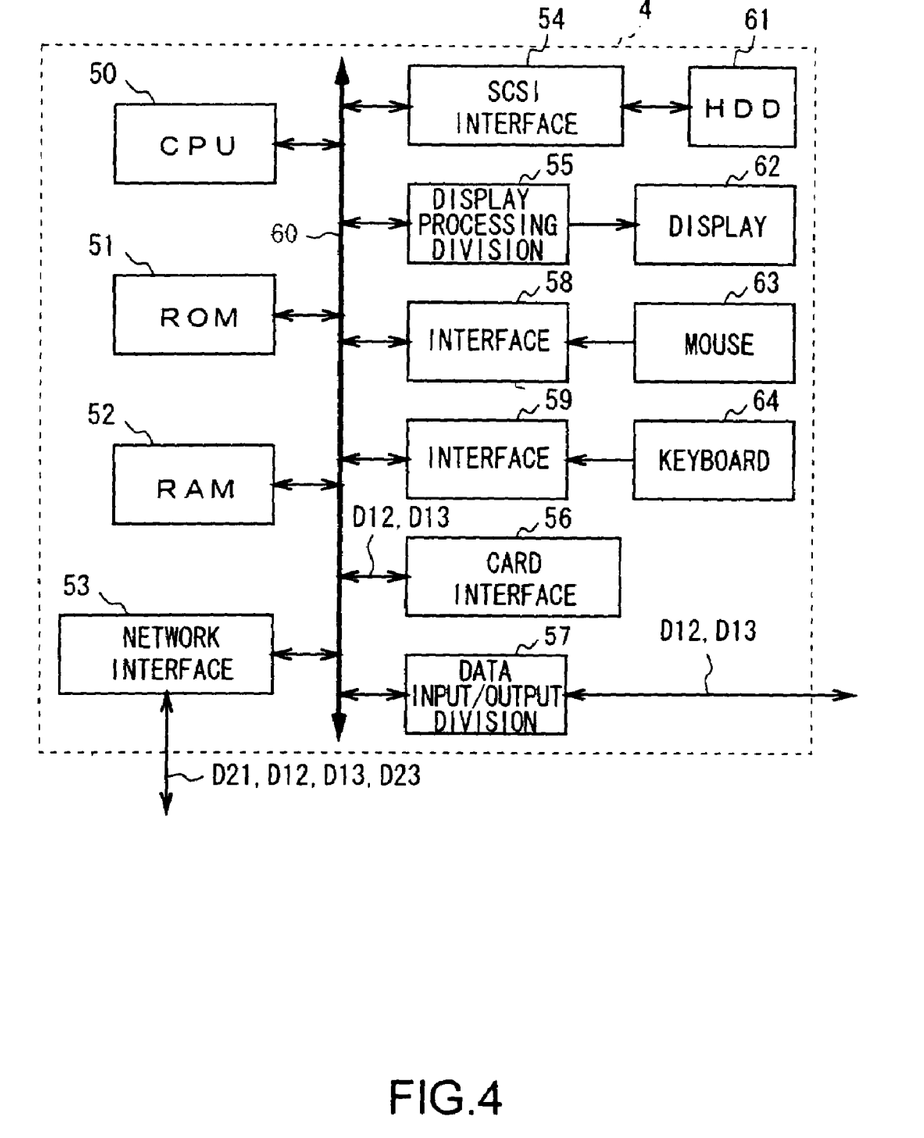
FIG. 4 is a block diagram showing a configuration of a client computer.

As shown in FIG. 4, the configuration of the client computer 4 is such that a CPU 50, a ROM 51, a RAM 52, a network interface circuit 53, a Small Computer System Interface (SCSI) interface circuit 54, a display processing division 55, a card interface circuit 56, a data input/output division 57 and interface circuits 58 and 59 are connected to each other via a bus 60, and a hard-disk drive 61, a display unit 62, a mouse 63 and a keyboard 64 are respectively connected to the SCSI interface circuit 54, the display processing division 55, the interface circuit 58 and the interface circuit 59.

In this case, when the command for capturing pictorial data from the digital still camera 2 has been given by manipulation of the mouse 63 or the keyboard 64, the CPU 50 sends the transfer request of the pictorial data to the digital still camera 2 via the data input/output division 57 so as to cause the digital still camera 2 to transfer the encoded pictorial data D12 and the identification data D13 as stated above, or reads out the encoded pictorial data D12 and the identification data D13 from the memory card 9 which has been taken out of the digital still camera 2 and then charged in the card slot (not shown), via the card interface circuit 56.

And, by giving the encoded pictorial data D12 and the identification data D13, which have been obtained in this manner, to the hard-disk drive 61 via the SCSI interface circuit 54, the CPU 50 records the encoded pictorial data D12 and the identification data D13 on the stated area of a hard disk included in the hard-disk drive 61.

Besides, when such an instruction that the above-mentioned print order program has to be downloaded has been given from the print dealer on the basis of manipulation of the mouse 63 or the keyboard 64, the CPU 50 sends the transfer request of its data (hereinafter, this is referred to as print order program data) D21 to the user management and order receiving computer 7 of the print order receiving side system division 6, via the network interface circuit 53.

And, via the data input/output division 57, the CPU 50 captures the print order program data D21 which has been transferred, as a result of this, from the user management and order receiving computer 7 of the print order receiving side system division 6, and then stores it in the RAM 52.

Figure 5:
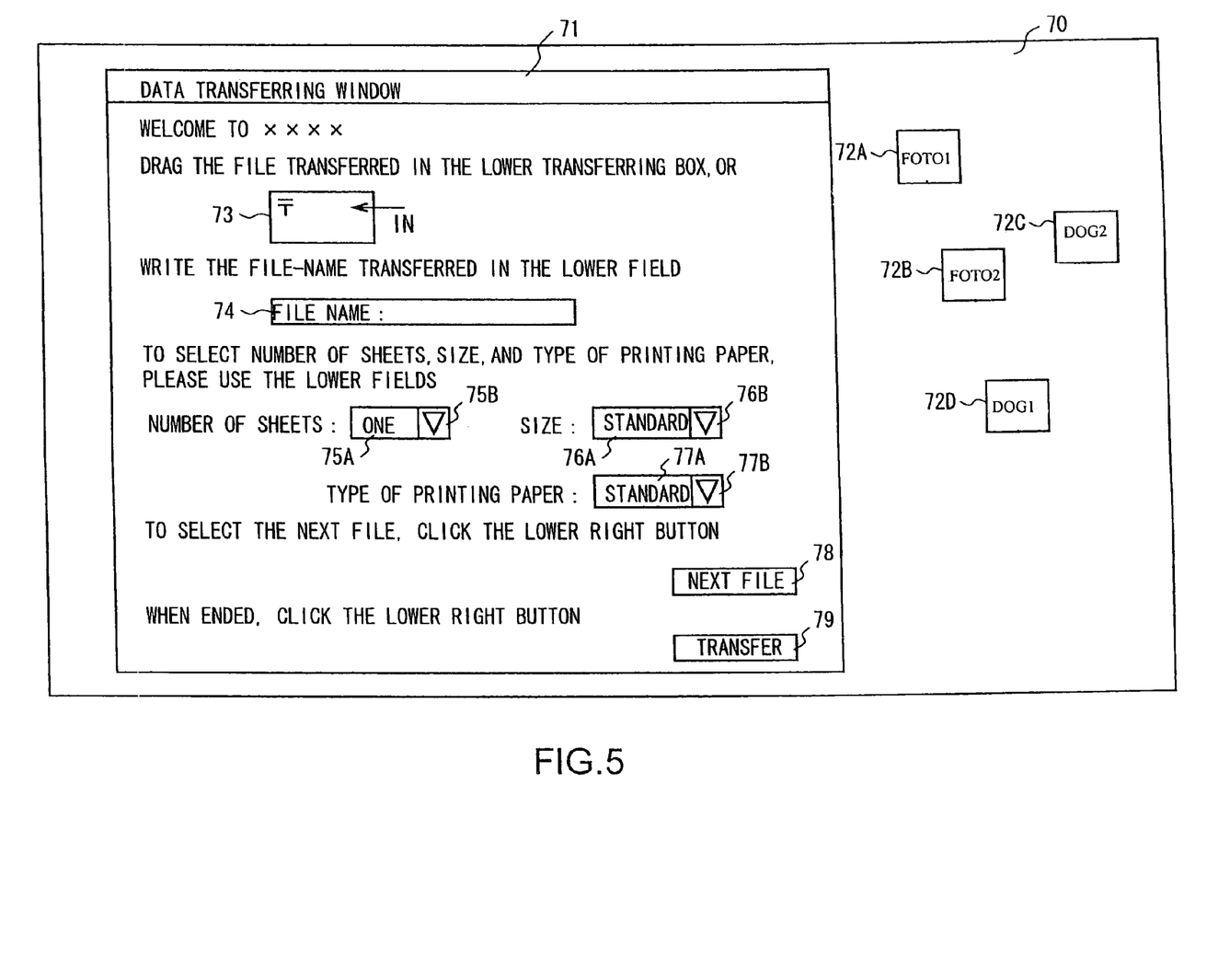
FIG. 5 is a schematic diagram showing an order panel.

And, the CPU 50 sends the pictorial data for the order panel, which is included in this captured print order program data D21, to the display processing division 55, so as to cause the display unit 62 to display such an order panel 70 based on the very pictorial data as that which is shown in FIG. 5.

In this case, this order panel 70 displays a data transferring window 71, as well as thumb nail pictures 72A to 72D of the respective pictures which have been captured from the digital still camera 2 or the memory card 9 and stored on the hard-disk drive 61.

And, the user is able to select such a picture that he or she wishes to give an order for a print of it, by dragging the thumb nail picture 72A to 72D of such a picture that he wishes to give an order for a print of it, out of the respective thumb nail pictures 72A to 72D which are displayed in the order panel 70, and then dropping this into a transferring box 73 included in the data transferring window 71, through a mouse manipulation, or by clicking a file-name inputting field 74 through a mouse manipulation, and then inputting the file-name of the very picture via the keyboard 64.

Besides, on this order panel 70, it is possible to select a number of the ordered sheets by clicking a number-of-ordered-sheets setting field 75A and then inputting the desired number of the print sheets utilizing the keyboard 64, or by clicking a pop-up menu button 75B of the right of the number-of-ordered-sheets setting field 75A to cause it to display the pop-up menu (not shown) and then clicking the desired number out of the very pop-up menu. The number of the ordered sheets which has been selected at this time is displayed in the number-of-ordered-sheets setting field 75A.

In addition, on this order panel 70, it is possible to select a print size by clicking a pop-up menu button 76B of the right of the print-size setting field 76A to cause it to display the pop-up menu (not shown) and then clicking the desired size out of the very pop-up menu; the print size which has been selected at this time is displayed in the print-size setting field 76A.

In addition, on this order panel 70, it is possible to select a printing paper by clicking a pop-up menu button 77B of the right of the printing-paper-type setting field 77A to cause it to display the pop-up menu (not shown) and then clicking the desired type of the printing paper out of the very pop-up menu; the type of the printing paper which has been selected at this time is displayed in the printing-paper-type setting field 77A.

And, after the user has selected a picture whose print should be ordered, the number of its print sheets, the print size, and the type of the printing paper, the user is able to select such a picture that he or she wishes to secondly give an order for a print of it, by clicking a next-file button 78.

In addition, when the selection of such all pictures that he or she wishes to give the orders for their prints and the selection of the number of the print sheets and the like of these pictures have been finished, the user would click a transfer button 79.

At this time, the CPU 50 would transfer the above-mentioned order data D23 which is comprised of the data of the number of the print sheets, the print size, and the type of the printing paper relevant to each picture which has been selected utilizing this order panel 70 to the user management and order receiving computer 7 of the print order receiving side system division 6, along with the encoded pictorial data D12 and the identification data D13 of the corresponding picture which are stored in the hard-disk drive 61, via the network interface circuit 53.

Thus, with the client computer 4, the user is able to give an order for the prints of the user's desired picture, on the basis of the print order program which has been downloaded from the user management and order receiving computer 7 of the print order receiving side system division 6.

(2-4) Configuration of Dedicated Terminal Device 5

Figure 6:
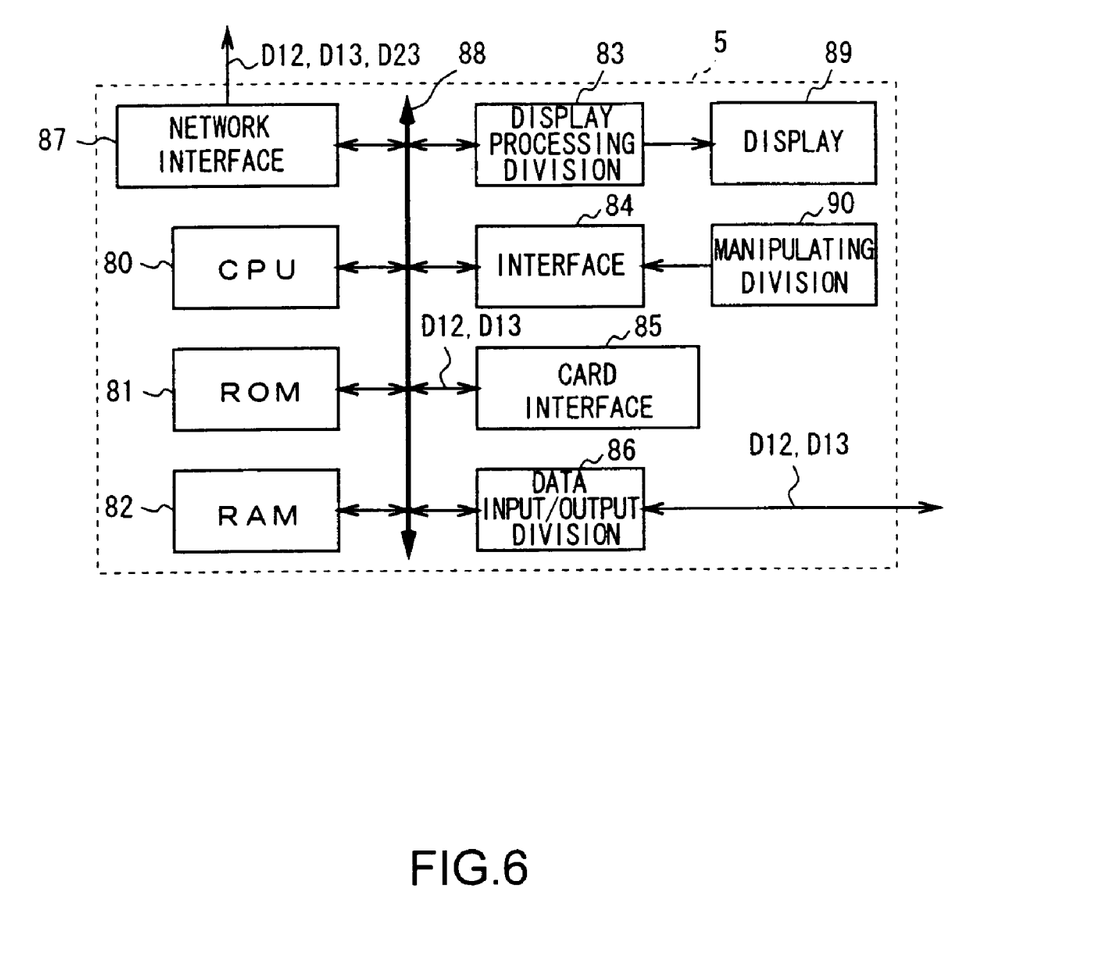
FIG. 6 is a block diagram showing a configuration of a dedicated terminal device.

On the other hand, as shown in FIG. 6, the dedicated terminal device 5 has such a configuration that a CPU 80, a ROM 81, a RAM 82, a display processing division 83, an interface circuit 84, a card interface circuit 85, a data input/output division 86, and a network interface circuit 87 are connected to each other via a bus 88, and a display unit 89 and a manipulating division 90 are respectively connected to the display processing division 83 and the interface circuit 84.

In this case, when the digital still camera 2 has been set in the stated status, or when the memory card 9 which has been taken out from the digital still camera 2 has been charged in the card slot (not shown) via the card inserting/extracting slit 5A (FIG. 1) and then a capture instruction of pictorial data has been inputted by manipulation of the manipulating division 90, the CPU 80 sends a transfer request of the pictorial data to the digital still camera 2 via the data input/output division 86, so as to cause the digital still camera 2 to transfer the encoded pictorial data D12 and the identification data D13 as stated above, or reads out the encoded pictorial data D12 and the identification data D13 from the memory card 9 which has been charged in the card slot, via the card interface circuit 85. And then, the CPU 80 stores these encoded pictorial data D12 and the identification data D13 in the RAM 82.

Next, the CPU 80 sends the pictorial data for the order panel out of the above-mentioned print order program which has been previously stored in the ROM 81 to the display processing division, thereby causing the display unit 89 to display the above-mentioned order panel 70 (FIG. 5). As a result of this, the user is enabled to select such a picture that he or she wishes to give an order for a print of it and to select the number of the print sheets, the print size, and the type of the printing paper, via the manipulating division 90, in the same way as the above, utilizing this order panel 70.

And, after this time, when the transfer button 79 of the order panel 70 has been pressed down by manipulation of the manipulating division 90, the CPU 80 sends the order data D23 which is comprised of the data of the order contents which have been inputted utilizing this order panel 70 to the user management and order receiving computer 7 of the print order receiving side system division 6 via the network interface circuit 87, along with the corresponding encoded pictorial data D12 and the identification data D13 which are stored in the RAM 82.

Thus, with the dedicated terminal device 5, the user is able to give an order for the prints, as with the case of the client computer 4.

(2-5) Configuration of Print-Order Receiving Side System Division 6

On the other hand, the print-order receiving side system division 6 is comprised of the user managing and order receiving computer 7, a mail destination printer 10, a receipt printer 11, and a printing division 14; the printing division 14 is composed of a printing control division 12 which is a personal computer and plural picture printers $13_1$ to $13_n$, as stated above.

Figure 7:
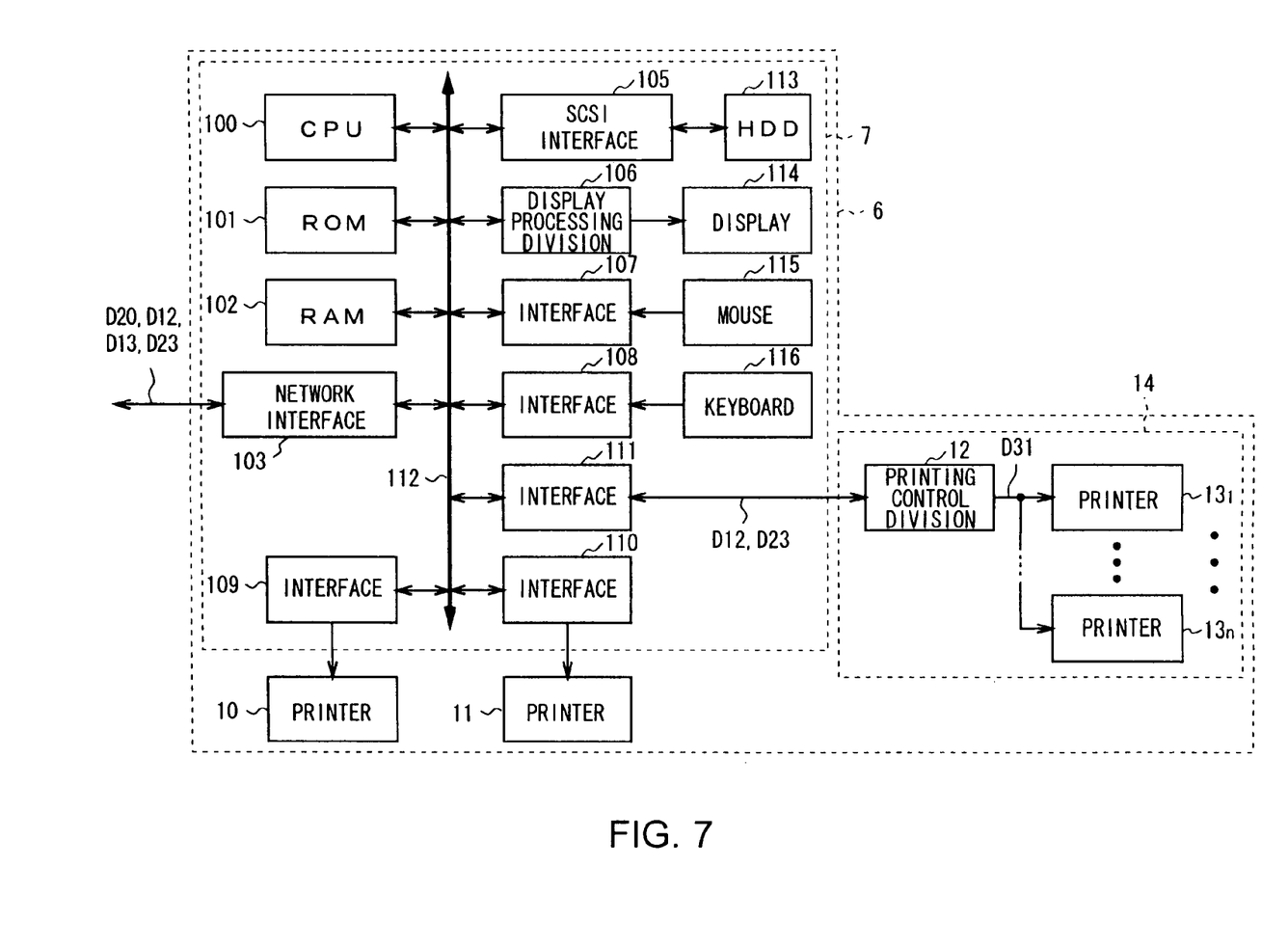
FIG. 7 is a block diagram showing a configuration of a user management and order receiving computer.

And, as shown in FIG. 7, the user management and order receiving computer 7 has such a configuration that a CPU 100, a ROM 101, a RAM 102, a network interface circuit 103, a SCSI interface circuit 105, a display processing division 106, and plural interface circuits 107 to 111 are connected to each other via a bus 112, and besides a hard-disk drive 113 and a display unit 114 are respectively connected to the SCSI interface circuit 105 and the display processing division 106, and besides a mouse 115, a keyboard 116, the mail destination printer 10, the receipt printer 11, and the printing control division 12 of the printing division 14 are respectively connected to their corresponding interface circuits 107 to 111.

In this case, when the user registration request and the user information D20 have been given from the registration device 3 via the network 8 as stated above, the CPU 100 creates a unique identification code, and then sends the above-mentioned identification data D13 which is comprised of the data of the very identification code to the registration device 3 via the network interface circuit 103.

Besides, via the SCSI interface circuit 105, the CPU 100 gives the user information D20 which has been obtained at this time and the identification data D13 which has been created at this time to the hard-disk drive 113, and causes it to store them, thereby registering these user information D20 and the identification data D13 in a database relevant to the user information D20 (hereinafter, this is referred to as a user-managing database) which is stored in the hard-disk drive 113.

Besides, when the transfer request of the print order program has been given from the client computer 4 as stated above, the CPU 100 reads the very print order program from the ROM 101, and then transfers this to the client computer 4 which has given the transfer request, via the network interface circuit 103.

In addition, when the order data D23 has reached along with the encoded pictorial data D12 and the identification data D13 from the client computer 4 or the dedicated terminal device 5 via the network 8 after this time, the CPU 100 takes the order data D23 and the identification data D13 in the RAM 102, and sends the encoded pictorial data D12 to the printing control computer 12 of the printing division 14 via the interface circuit 111.

And, after this time, the CPU 100 judges whether the identification code based on the identification data D13 which has been taken in the RAM 102 has been registered in the user-managing database or not; when it has obtained the affirmative result, it sends the printing execute instruction as well as the order data D23 which has been taken in the RAM 102 to the printing control computer 12 of the printing division 14, via the interface circuit 111.

The printing control computer 12 is managing the operations of the plural picture printers $13_1$ to $13_n$ as stated above, and, when the printing execute instruction and the order data D23 have been given from the user management and order receiving computer 7, it sends pictorial data D31, which has been obtained by decoding the previously given encoded pictorial data D12, to one of the picture printers $13_1$ to $13_n$ which is unused at this time, as stated above.

Besides, on the basis of the order data D23 which has been given from the user management and order receiving computer 7 together with this, the printing control computer controls the one of picture printers $13_1$ to $13_n$ in a manner so as to cause it to perform printing of each picture by the specified number of sheets, with the print-size and the printing-paper which accord with the user's order.

Besides, at this time, in the case where the identification data D13 which has been taken in the RAM 102 is already registered in the user-managing database, the CPU 100 of the user management and order receiving computer 7 controls the mail destination printer 10 on the basis of the very user-managing database in a manner so as to cause it to print the name and the address of the very user on an envelope.

In addition, the CPU 100 calculates the charge of the prints on the basis of the order data D23, retrieves the banking organ on which the user's account has been opened on the basis of the user-managing database, accesses the computer of the very banking organ on the basis of the result of the retrieval, and requests it to transfer the sums of the charge based on the result of the above-mentioned retrieval to the print dealer's account; on the other hand, the CPU 100 then controls the receipt printer device in a manner so as to cause the receipt printer 11 to print the receipt toward the very transference.

Thus, the print order receiving side system division 6 is able to perform printing which accords with the order, on the basis of the order data D23 and the encoded pictorial data D12 which are given from the client computer 4 or the dedicated terminal device 5; on the other hand, the print order receiving side system division 6 is able to recognize the orderer on the basis of the identification data D13 which is transferred and reached along with these order data D23 and encoded pictorial data D12, and able to perform transference of the printed photograph, deriving the charge, and the like.

(3) Operation and Effects of the Embodiment

In this print order/delivery system 1 having the above configuration, when the required user information such as the name, the address, the telephone number, and the account number of the user has been inputted to the registration device 3 after the digital still camera 2 has been set to the registration device 3 and set to the stated status, the identification code would be assigned to the very digital still camera 2, on the other hand, the very user information is transferred to the user management and order receiving computer 7 of the print order receiving side system division 6 via the network 8, and registered in the user-managing database in such a manner that the very user information is associated with the identification code.

And, when the user of the digital still camera 2 gives an order for prints to the print dealer by the use of the client computer 4, he or she sets the very digital still camera 2 to the stated status, or charges the memory card 9 which has been taken out of the very digital still camera 2 in the card slot of the client computer 4, and then inputs the required information relevant to the selection of the picture, and to the selection of the number of the print sheets, the print size, the type of the printing paper and so on, utilizing the order panel 70 which is displayed on the display unit 62, on the basis of the print order program which has been downloaded from the user management and order receiving computer 7 of the print order receiving side system division 6, and then he or she clicks the transfer button 79 of the order panel 70.

When the user gives an order to the print dealer by the use of the dedicated terminal device 5, he or she sets the digital still camera 2 to the stated status, or charges the memory card 9 which has been taken out of the very digital still camera 2 in the card slot of the dedicated terminal device 5, and then inputs the required information relevant to the selection of the picture, and to the selection of the number of the print sheets, the print size, the type of the printing paper and so on, utilizing the order panel 70 which has been displayed, manipulating the manipulating division 90 of the dedicated terminal device 5, and then he or she clicks the transfer button 79 of the order panel 70.

As a result of this, the order data D23 corresponding to the order contents which have been inputted by the user in this way is given to the user management and order receiving computer 7 of the print order receiving side system division 6, along with the encoded pictorial data D12 and the identification data D13 which are needed, via the network 8.

And, the print order receiving side system division 6 judges whether the orderer is a registered user or not on the basis of the identification data D13 which is supplied along with the order data D23, and, if the orderer is a user who has been registered, decodes the encoded pictorial data D12 through the printing control computer 12, and then gives the decoded data to picture printers 13$_1$ to 13$_n$, thereby causing them to print the pictures based on the very encoded pictorial data D12 by the ordered number of sheets, with the print size and the printing paper which accord with the order.

Moreover, in the print order receiving side system division 6, the mail destination is printed on an envelope on the basis of the order data D23 and the user-managing database, and the accounting is performed, so as to transfer the sum of the charge from the user's account to the dealer's own account, and then the receipt based on the very accounting is printed.

And, the printed photographs are entered in the envelope on which the mail destination has been printed by the print dealer along with the receipt, and then sent to the user by mail.

Therefore, in this print order/delivery system 1, a user is not required to go to the stated window at the time when giving the order for prints and also at the time when receiving them, and so the user's burden relevant to the ordering and receiving of the prints can be remarkably reduced.

Besides, in this print order/delivery system 1, the identification data D13 would be transferred to the print-order receiving side along with the encoded pictorial data D12 and the order data D23 at the time that a user gives an order for prints, and the very print dealer would recognize the user on the basis of this identification data D13 and perform mailing and billing processes; therefore, even though any client computer 4 or any dedicated terminal device 5 is utilized, the user is able to make a request for printing with a simple procedure, and so the user's burden relevant to ordering and receiving of the prints can be further reduced.

According to the above configuration, ordering for prints is performed via the network 8 and delivering is performed by mail, and the charge of the prints is paid by transferring the sum from the bank account or the post account, since the user is able to omit going to the stated window in order to give the order for prints and to receive them, in this way, it is possible to realize a print order/delivery system which is able to make the ordering and receiving of the prints easy.

(4) Other Embodiments

In the above embodiment, such a case has been described that a non-volatile memory 33 has been used as the storage means for storing the identification data D13; however, we do not intend to limit the present invention to such, and other wide variety of storage means can be adopted.

Besides, in the above embodiment, such a case has been described that the client computer 4 and the dedicated terminal device 5, which are the ordering means for transmitting the pictorial data (the encoded pictorial data D12) to the user management and order receiving computer 7 of the print order receiving side system division 6 along with the identification data D13 and the order data D23, are constructed as shown in FIG. 4 and FIG. 6; however, we do not intend to limit the present invention to such, and other wide variety of configurations can be adopted.

In addition, in the above embodiment, such a case has been described that the source of the pictorial data (the encoded pictorial data D12) is a digital still camera 2 or a storing medium (the memory card 9) which had been charged in the very digital still camera 2; however, we do not intend to limit the present invention to such; it is possible to utilize other wide variety of electronic devices such as a scanner, a digital video camera, a client computer itself which has a computer graphics creating function. In this case, storing means for storing the identification data D13 can be placed in the electronic devices.

In addition, in the above embodiment, such a case has been described that a printing means for printing the picture based on the encoded pictorial data D12 which is supplied from the client computer 4 or the dedicated terminal device 5 on the basis of the order data D23 is comprised of the printing control computer 12 and the plural printers $13_1$ to $13_n$; however, we do not intend to limit the present invention to such; the function of the printing control division can be installed in the user management and order receiving computer 7, and the printing control computer 12 can be omitted, in this way, other wide variety of configurations can be adopted as the configuration of the printing means.

In addition, in the above embodiment, such a case has been described the user management and order receiving computer 7, which serves, in the print order receiving side system division 6, as a user managing means for recognizing the orderer on the basis of the identification data D13 supplied from the client computer 4 or dedicated terminal device 5, is constructed as shown in FIG. 7; however, we do not intend to limit the present invention to such, and other wide variety of configurations can be adopted.

In addition, in the above embodiment, such a case has been described that the user managing and order receiving computer 7, which performs user management and print-order receiving processing, is also used as an accounting means for calculating the print charge on the basis of the order data D23 and for performing the stated accounting processing (for instance, transferring the sum between the accounts) on the basis of the result of the calculation; however, we do not intend to limit the present invention to such; alternatively, an accounting means like the above can be provided apart from the user managing and order receiving computer 7 for performing user management and print-order receiving processing.

In addition, in the above embodiment, such a case has been described that only print-order function has been installed on the dedicated terminal device 5; however, we do not intend to limit the present invention to such; other functions such as reservation service relevant to tickets of a concert, an airplane and a train as well as mail-order service function can be added to the dedicated terminal device 5.

In addition, in the above embodiment, such a case has been described that the data such as the encoded pictorial data D12 is transmitted from the client computer 4 or the dedicated terminal device 5 to the user management and order receiving computer 7 of the print order receiving side system division 6, via the network 8 such as a telephone line network and the Internet; however, we do not intend to limit the present invention to such; the data can be transmitted with a wireless system for instance, and other variety of methods can be adopted as the data transmission methods.

In addition, in the above embodiment, such a case has been described that the print dealer delivers the photographs, which are the results of the printing, to the orderer by mail; however, we do not intend to limit the present invention to such; the print dealer can inform the orderer about a convenience store and the like near the address of the orderer, and can let him go to the convenience store to receive the photographs.

Besides, in a same manner as this, in the above embodiment, such a case as been described that the print dealer would receive the charge for the prints through transferring the sum between the accounts; however, we do not intend to limit the present invention to such; the print dealer can receive the charge by means of the credit, payment at the time when the prints are handed over, payment for transferring the sum to the dealer's account, or a registered mail. In this case, in the case of payment for transferring the sum of the charge to the dealer's account, a bill which can be utilized to pay the sum of the charge at the window of a banking organ such as a bank and a post office as well as a convenience store can be sent, instead of the receipt, to the orderer of the prints along with the photographs, by mail for instance.

In addition, such a system is also preferable that the orderer can previously select out of such order methods and paying methods of the charge, utilizing the order panel 70.

Figure 8:
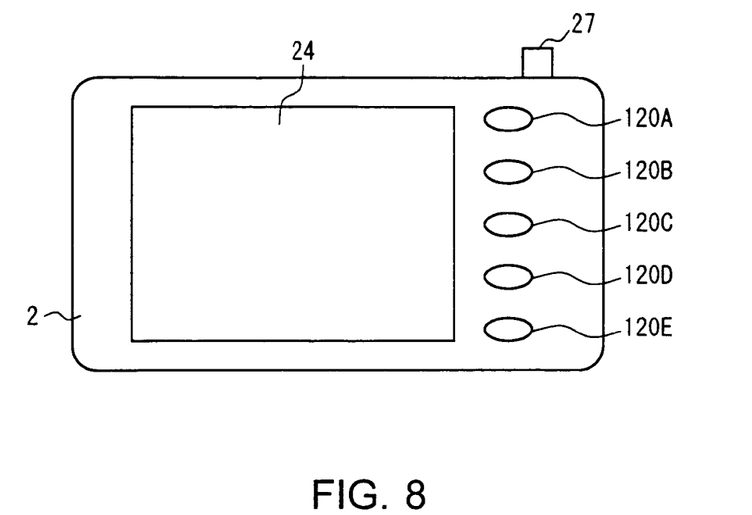
FIG. 8 is a schematic diagram used for explaining the other embodiment.
Figure 9:
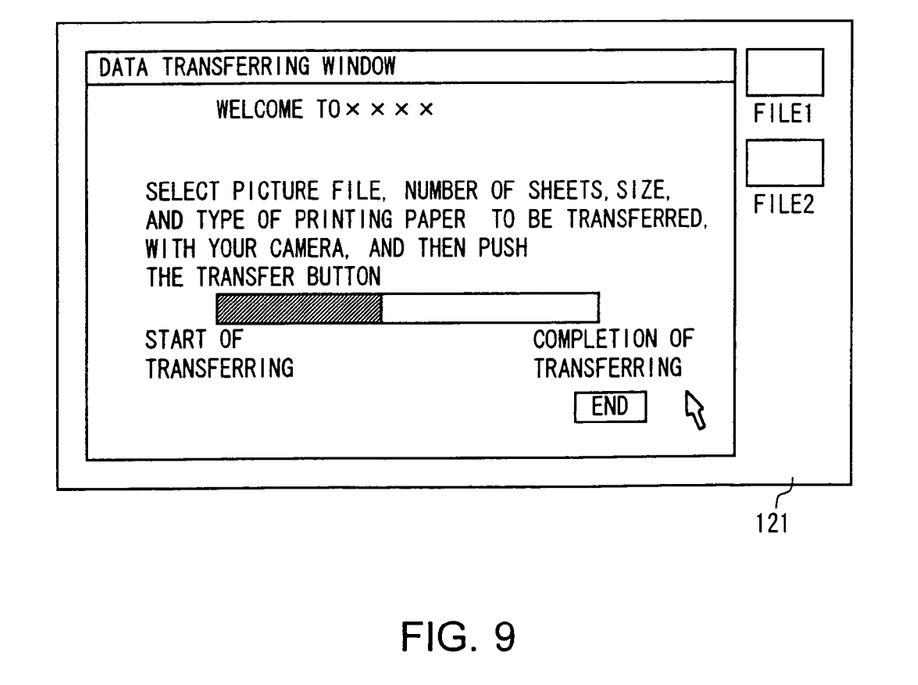
FIG. 9 is a schematic diagram used for explaining the other embodiment.

In addition, in the above embodiment, such a case has been described that the order contents such as the number of the print sheets are selected by means of the client computer 4 or the dedicated terminal device 5; however, we do not intend to limit the present invention to such; for instance, such a system is also preferable that a digital still camera 2 shown in FIG. 8 is provided with the respective manipulation buttons 120A-120E for picture selection, number-of-sheets selection, size selection, printing paper selection, and data transfer command, so that, by manipulating these buttons, it is possible to input the data of picture selection, number-of-sheets selection, size selection, printing paper selection and the data transfer command at the time of print ordering, by means of the digital still camera 2, and it is possible to transmit the order data D23 that is corresponding to these inputted contents to the user management and order receiving computer 7 of the print order receiving side system division 6, via the client computer 4 or the dedicated terminal device 5. In this case, it is also preferable to cause the display unit 62 of the client computer 4 or the display unit 89 of the dedicated terminal device 5 to display an order panel 121 such as that which is shown in FIG. 9.

In addition, in the above embodiment, such a case has been described that the identification data D13 and the like are transferred from the client computer 4 and the dedicated terminal device 5 just as it is; however, we do not intend to limit the present invention to such; the identification data D13 and the like can be enciphered and then transferred, so that leakage of the personal information can be prevented.

In addition, in the above-mentioned embodiment, such a case has been described that recognition of the orderer is performed on the basis of only the identification data D13, on the print-order receiving side; however, we do not intend to limit the present invention to such; such a system is also preferable that the enciphered number for user recognition and/or the user's own personal features such as the finger prints and the voice patterns are previously registered on the print-order receiving side, and the enciphered number which has been inputted via the inputting means placed in the client computer 4 or the dedicated terminal device 5 and/or the data of the finger prints or the voice patterns which have been detected by a detecting means of the finger prints or the voice pattern and the like are transferred to the print-order receiving side along with the identification data D13 at the time of print ordering, and then recognition of the user is performed on the print-order receiving side on the basis of this transferred data for recognition. In this way, illegal usage of the digital still camera 2 can be prevented efficiently.

In addition, in the above-mentioned embodiment, such a case has been described that the client computer 4 downloads the print order program from the print-order receiving side, and displays such an order panel 70 as that which is shown in FIG. 5; however, we do not intend to limit the present invention to such; such an order panel can be displayed on the screen of a Web site which has been opened by the print-order receiving side, or the print order program can be distributed to the user side via a recording medium.

As described above, according to the present invention, a print order/delivery system comprises: a storage means for storing a previously assigned unique identification data; a registration means for registering the user in such a way as to associate him with the identification data; an ordering means for transmitting a pictorial data to the print-order receiving side along with the identification data and an order data; and a user management means for recognizing the orderer out of the registered users, on the basis of the identification data which is transmitted from the ordering means, on the print-order receiving side. By this, the burden on the print orderer can be reduced, in this way, it is possible to realize a print order/delivery system which can make print ordering easy.

Besides, according to the present invention, a print order/delivery method comprises the steps of: storing a previously assigned unique identification data which is performed on the user side, and registering the user in such a way as to associate him with the identification data; transmitting pictorial data to the print order receiving side along with the identification data and order data; and printing the picture based on the supplied pictorial data on the basis of the order data, recognizing the orderer out of the registered users on the basis of the supplied identification data, and delivering the resulted prints of the picture to the very orderer, which are performed on the print-order receiving side. By this, the burden on the print orderer can be reduced, in this way, it is possible to realize a print order/delivery method which can make the print ordering and receiving easy.

Further, according to the present invention, a digital camera comprises a storage means for storing unique identification data previously assigned to the digital camera. By using this digital camera, it is possible to construct the print order/delivery system which can make the print ordering and receiving easy.

Still further, according to the present invention, a client information registration device comprises an identification data assigning means for previously assigning unique identification data to a digital camera. By using this client information registration device, it is possible to construct the print order/delivery system which can make the print ordering and receiving easy.

Furthermore, according to the present invention provides, an ordering terminal device comprises a data inputting means for inputting pictorial data of the picture and the identification data from a digital camera which is previously assigned unique identification data. By using this ordering terminal device, it is possible to construct the print order/ delivery system which can make the print ordering and receiving easy.

Moreover, according to the present invention, a printing system for printing a picture taken by a digital camera having identification data previously assigned comprises: a receiving means for receiving identification data and user information transmitted from a registration means side which registers a user associated with the identification data or receiving pictorial data of the picture, the identification data and order data transmitted from a print ordering side; a printing means for printing a picture based on the pictorial data on the basis of the received order data; and a user management means for recognizing the orderer out of the registered users on the basis of the received identification data. By using this printing system, it is possible to construct the print order/delivery system which can make the print ordering and receiving easy.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A print order/delivery system comprising:
   a registration apparatus that assigns unique device identification data to an electronic device and registers a user in such a way as to associate the user with the identification data;
   an ordering apparatus that transmits pictorial data to a print order receiving side along with the identification data and order data;
   a printer on the print order receiving side that prints a picture based on the pictorial data and the order data, which are transmitted from the ordering apparatus; and
   a user management apparatus, on the print order receiving side, that recognizes the user from a group of registered users, based on the identification data which is transmitted from the ordering apparatus;
   wherein the registration apparatus is configured to receive user information, and to assign the unique device identification data based on the received user information to the electronic device, which electronically takes a picture and generates the pictorial data, the electronic device receiving and storing the unique device identification data assigned by the registration apparatus, wherein the user information includes address information and/or billing information, and the user information and unique device identification data are stored and used to facilitate the ordering of prints of the pictorial data based on the unique device identification data, such that when the user management system recognizes the user based on the identification data, the user information is automatically retrieved for purposes of ordering the prints; and
   wherein the ordering apparatus is configured to receive the identification data and the pictorial data stored in the electronic device or a recording medium which is attached to the electronic device, and to transmit the pictorial data and the identification data to the print order receiving side along with the order data.

2. The print order/delivery system according to claim 1, wherein the electronic device is a digital camera comprising a non-volatile memory for storing the identification data.

3. The print order/delivery system according to claim 2, wherein the recording medium is a memory card and the digital camera comprises a recorder that records the identification data read out from the non-volatile memory and the generated pictorial data on the memory card, wherein the ordering apparatus is configured to receive the identification data and the pictorial data from the memory card.

4. The print order/delivery system according to claim 1, further comprising:
   an accounting unit that calculates a charge on the basis of the order data, and that performs accounting processing on the basis of a result of the calculation.

5. A print order/delivery method comprising:
   assigning unique device identification data to an electronic device;
   registering a user in such a way as to associate the user with the identification data, wherein based on received user information, the unique identification data is assigned and stored in the electronic device, which electronically takes a picture and generates pictorial data;
   transmitting the pictorial data to a print order receiving side along with the identification data and order data, wherein the pictorial data and the identification data are removed from the electronic device or a recording medium which has been attached to the electronic device;
   recognizing, on the print order receiving side, the user from a group of registered users based on the supplied identification data; and
   printing a picture based on the pictorial data and the order data, wherein the user information includes address and/or billing information, and the user information and unique device identification data are stored and used to facilitate the ordering of prints of the pictorial data based on the unique device identification data, such that when the user is recognized based on the identification data, the user information is automatically retrieved for purposes of ordering the prints.

6. The print order/delivery method according to claim 5, wherein the electronic device is a digital camera comprising a non-volatile memory, and the identification data is stored in the non-volatile memory.

7. The print order/delivery method according to claim 6, wherein the recording medium is a memory card and the identification data read out from the non-volatile memory and is recorded on the memory card, along with the generated pictorial data.

8. The print order/delivery method according to claim 5, wherein on the print order receiving side, a cost charge of the print is calculated on the basis of the order data, and accounting processing is performed on the basis of a result of the calculation.

9. A printing system for printing a picture taken by a digital camera, which has been previously assigned a unique identification data associated with the camera, comprising:
   a receiver that receives the unique device identification data and user information transmitted from a registration apparatus, the registration apparatus registers a user associated with the identification data, the receiver also receives pictorial data of the picture, the identification data and order data transmitted from a print ordering side;
   a printer that prints a picture based on the pictorial data on the basis of the received order data; and
   a user management apparatus that recognizes a user from a group of registered users on the basis of the received identification data, wherein the user information includes address and/or billing information, and the user information and unique device identification data are stored and used to facilitate the ordering of prints of the pictorial data based on the unique device identification data, such that when the user management system recognizes the user based on the identification data, the user information is automatically retrieved for purposes of ordering the prints.

10. The printing system according to claim 9 further comprising:
    an accounting unit that calculates a charge on the basis of the order data, and that performs accounting processing on the basis of a result of the calculation.

11. The printing system according to claim 10, wherein the user management apparatus comprises a database containing the user information associated with the identification data.

* * * * *